United States Patent [19]

Madsen

[11] Patent Number: 4,811,040

[45] Date of Patent: Mar. 7, 1989

[54] NUMISMATIC DETECTOR

[76] Inventor: Erik H. Madsen, 2405 Camino Way, Salt Lake City, Utah 84121

[21] Appl. No.: 860,996

[22] Filed: May 8, 1986

[51] Int. Cl.⁴ .................... G03B 15/02; G03B 29/00; G07F 3/02; G01B 11/30
[52] U.S. Cl. ........................ 354/75; 354/126; 354/292; 356/371; 73/163
[58] Field of Search ............... 384/75, 76, 80, 126, 384/129, 292, 354; 194/302, 328, 330; 355/67, 75; 209/579; 356/371; 73/163; 453/63

[56] References Cited

U.S. PATENT DOCUMENTS

| | | | |
|---|---|---|---|
| 3,407,294 | 10/1968 | Hill | 355/67 |
| 3,643,568 | 2/1972 | Guillet et al. | 354/129 X |
| 3,964,829 | 6/1976 | Munis | 355/75 |
| 4,058,820 | 11/1977 | Hollen | 354/80 |
| 4,202,630 | 5/1980 | Suzecki et al. | 356/371 |

Primary Examiner—W. B. Perkey
Attorney, Agent, or Firm—B. Deon Criddle

[57] ABSTRACT

A numismatic detector including a laser generator, a light collimator to form generated laser light into discrete beams, a coin holder to precisely position coins to be detected, and a film pack adapted to receive reflection of discrete light beams from the surface of the coin.

11 Claims, 2 Drawing Sheets

NUMISMATIC DETECTOR

BACKGROUND OF THE INVENTION

1. Field of the Invention

The present invention relates to numismatic detectors, and is particularly concerned with detectors of the type used by coin collectors and others to identify particular coins and as an aid in the grading of such coins in the determination of their actual current value.

2. Prior Art

It has long been recognized in the field of numismatics that the value of a coin is largely dependent upon the characteristics of the coin itself. For example, some coins have significant value because of particular minting flaws. Others, may have increased worth, because of the condition of the coins, in comparison with the condition of other coins of like mintage. In almost all instances, where a numismatic coin is to be traded, or sold, it is important that the coin can be properly graded so that the seller and buyer can arrive at a proper value determination. In the past gradings used have included good, very good, fine, very fine, extremely fine, and about uncirculated. Rare coins have also been graded as fair, or about good. A coin graded according to these categories, has definite value meaning to a coin collector. However, it has long been recognized that the determination of the specific one of the categories to be applied to any given coin is a subjective matter, involving the judgment and opinion of the buyer and seller. Generally, of course, the seller is attempting to have the coin graded as high as possible and the buyer desires the coin to be graded lower for purposes of the transaction. The American Numismatic Association has established a more precise standard grading schedule i.e., the Sheldon Mint Grading System, which uses a number system wherein coins are rated on an increasing number valuations, i.e. 40, 45, 50, and 55 and MS 60, MS 61, ... MS 70 are used to indicate increasingly better quality in the coins so graded. Certain coins, because of their particular value, or particular characteristics, become well known in the numismatic field, as they are traded or sold to one collector or another.

Devices used to provide a general identification of the coin, have long been available for use in coin operated vending machines, and the like. Such coin testing devices may incorporate apparatus that can be of value to the numismatic field. For example, U.S. Pat. No. 4,184,366, discloses an apparatus for testing the diameter, composition, and thickness of a coin. It may also test the weight of the coin. These data can be very helpful, to a coin collector. Also, U.S. Pat. No. 4,546,868, used optical devices which detect factors, such as diameter, thickness, and weight of rolling coins to determine whether or not they are acceptable to vending machines.

Other devices, more specifically developed for the numismatic field, include U.S. Pat. No. 3,349,612, for a "Silhouette Coin Grader" wherein a coin is positioned within a holder and a slide having transparencies showing a coin of the same type are passed over so that the surface of the coin being tested can be compared against graded surfaces shown in the transparencies to determine the actual grade of the coin. U.S. Pat. No. 3,728,795, shows a "Coin Degree Finder" that can be used to readily determine to what degree the opposite side of a coin is off clockwise or counterclockwise respective to the other side of the coin. U.S. Pat. No. 4,134,209, discloses a device and method for measuring the die rotation error of coins and is important to coin collectors, since such errors occur during the process of coining the money.

U.S. Pat. Nos. 4,128,158 and 4,226,323 to Joseph L. Dautremont, disclose precision coin analyzers for numismatic applications. The devices disclosed in these patents, use electrical circuitry to separate genuine coins from counterfeit coins. The testing devices are adaptable to use in vending machines, and further are adapted to use for those purchasing bullion coins. The devices are particularly adaptable for use in detecting coins fabricated to have a valuable metal exterior coated on a base metal disc.

It has also been recognized that there is a need for apparatus to clearly identify coins so as to prevent fraud during the sale of such coins, and to allow them to be identified in the event of recovery after a theft. Thus, U.S. Pat. No. 4,058,820, discloses a method and apparatus for obtaining coin identification photographs and for coding such photographs for registration and picture identification confirmation. The apparatus disclosed in the patent includes means for properly positioning a coin face to be photographed so that the photograph will record the condition of the coin face. The apparatus provides indexing or reticle lines for locating the position of aberrations on a coin face so that the coin can be readily compared to the photograph, should such be necessary for identification of the coin.

OBJECTS OF THE INVENTION

Principal objects of the present invention are to provide a means for even more positively identifying a coin by the characteristics of the coin, of further standardizing the grading of a coin by its surface characteristics and of making a permanent record of such characteristics to be used in commercial transactions involving the coin.

Another object is to provide an identification device wherein the scratches and irregularities in the coin surface are enhanced in a photographic image so as to facilitate identification and grading of the coin.

FEATURES OF THE INVENTION

Principal features of the invention include the use of a collimated laser beam directed to the surface of a coin to be identified, and reflected to a photographic film for the production of a recorded image of the surface of the coin from which the beam is reflected.

The laser beam generator is mounted to revolve and the beam is directed through a pattern of holes in a collimating screen before being directed onto a surface of a coin. The coin is precisely positioned on a light absorbing surface, so that the reflected laser beam will be photographed, without disturbance from non-relevant reflections. The extent of diffusion of the reflected beam projected through each hole is determined by surface irregularities and is displayed on the photographic film receiving the reflected beam. An overall coin surface is then "mapped" by directing the laser beam through the pattern of holes and providing sequential reflections to the photographic film. This "mapped" photographic image becomes an accurate record of the coin and clearly shows the extent of wear and other characteristics of the coin.

Positioning means are used to hold the coin in position to be photographed and the positioning means can rotate the coin to orient it so that the view photographed and observed becomes a standard view.

Other objects and features of the invention will become apparent from the following detailed description and drawings, disclosing what is presently contemplated as being the best mode of the invention.

THE DRAWINGS

DETAILED DESCRIPTION

Figure 1:
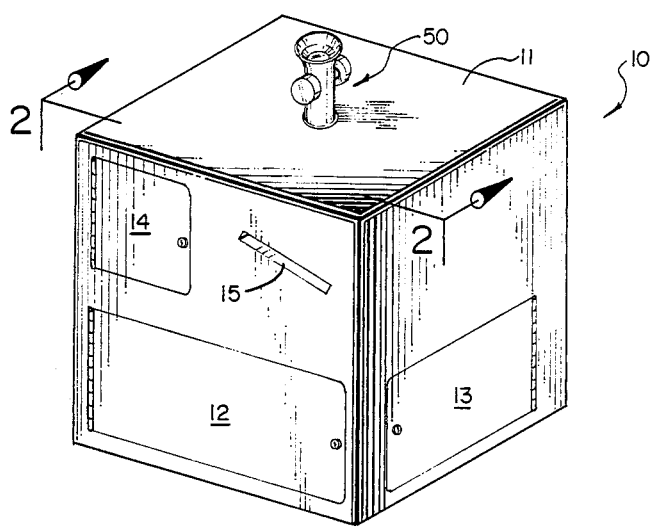
FIG. 1 is a perspective view of the numismatic detector of the invention.

Referring now to the drawing:

In the illustrated preferred embodiment, the numismatic detector of the invention is shown generally at 10. As shown, the detector includes a housing 11, of generally box-like configuration, and with access doors 12 and 13 in a lower portion thereof to permit positioning and removing of coins, or other objects to be processed. Another door 14, opens into a side wall of housing 11 to provide access to the laser compartment, as will be further described. A cassette door 15 is provided through which film cassettes are inserted and removed, also as will be further described.

Figure 2:
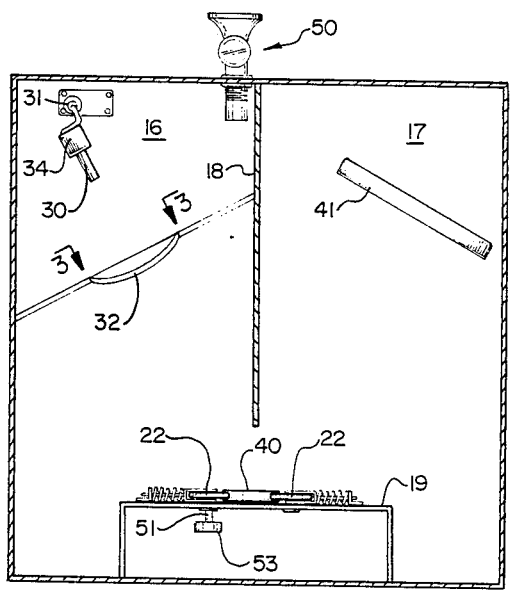
FIG. 2 is a vertical elevation view taken on the line 2—2 of FIG. 1.

As shown best in FIG. 2, a laser compartment 16 is provided in an upper portion of the housing 11, at one side thereof. A film compartment 17 is similarly provided in an upper portion of the housing 11, at another side thereof, with the laser compartment and the film compartment being separated by a wall 18. The wall 18 extends downwardly from a top of the housing 11 to a location just above a coin holder table 19, that is positioned in the bottom portion of the housing 11. The partition 18 has dark surfaces to absorb stray light rays, as will be further explained. The table 19 is preferably covered wth a soft, dark material, such as polyurethane foam 20, so that the surfaces of coins place thereon will not be marred. Coins placed on the table are held in precisely centered position by three equi-angularly spaced soft wheels 22. Each wheel 22 is pivotally mounted to one end of a rod 23 that extends into a tube 24. Spring 25 inside the tube and acting against a collar on the rod lightly biases the rod and the wheel away from the tube 24. Each tube 24 is pivoted at 26 to the top of the table 19 so that it will swing with respect to the table top. In use, a coin positioned between the three wheels 22 is held in a center position by the wheels and the springs 25. Because the wheels 22 are of a soft material such as polyurethane, they do not damage the peripheral edge of the coin.

A laser tube 30 is gimbal mounted at 31 with respect to the housing 11 and a laser beam generated from the laser tube 30 is directed through a collimation screen 32 that is positioned between the end of the laser tube and the table 19. A drive motor 34, also carried by housing 11 is adapted to rotate the end of the laser tube 30 opposite the gimbal mounting 31 to change the direction of the generated laser beam. The laser beam, is sequentially directed through each of the holes, 45 of a pattern of holes through the collimating screen, to provide discrete light beams that are each directed onto a coin 40 positioned between wheels 22 on the table 19.

Figure 5:
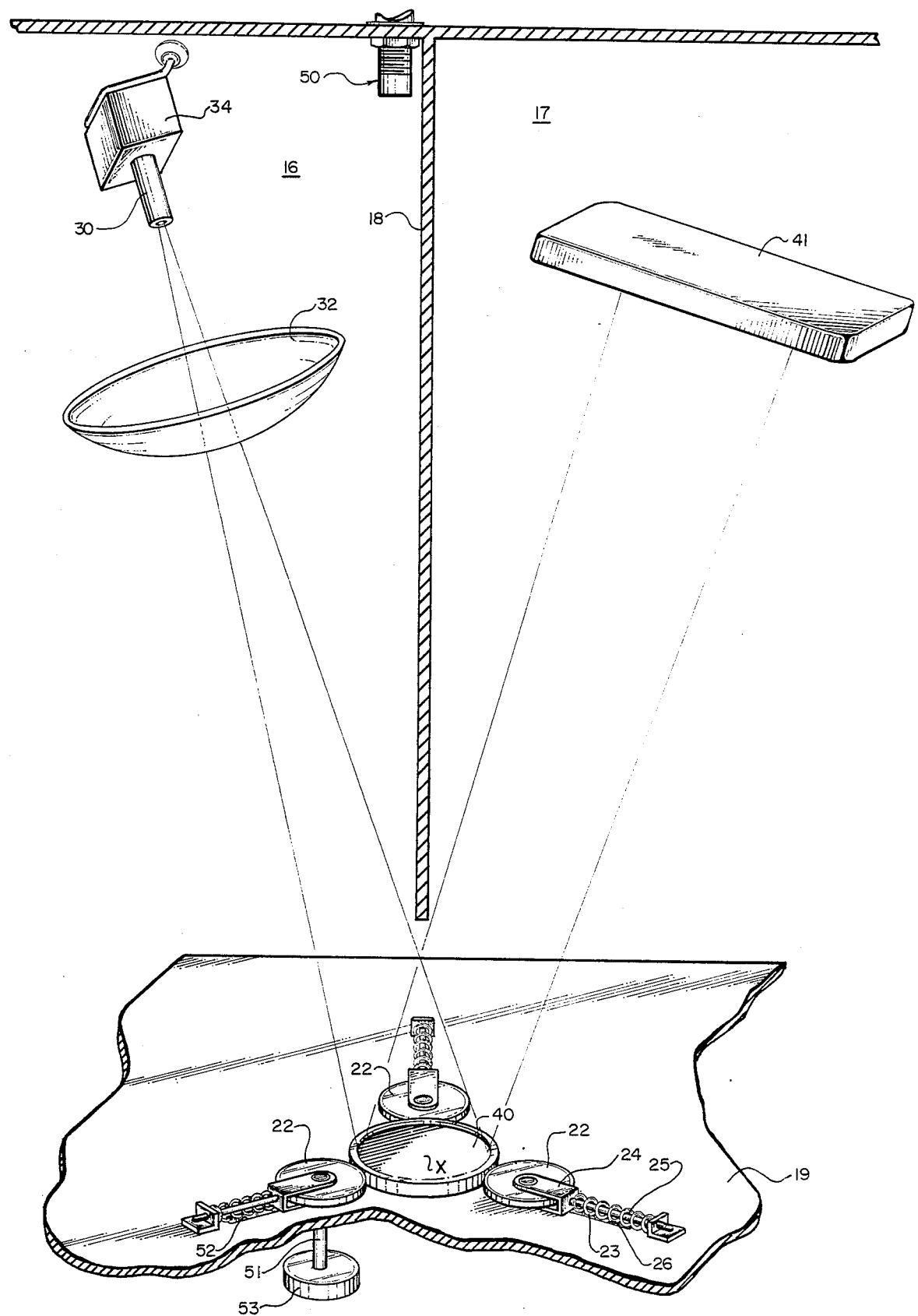
FIG. 5 is a schematic view of the apparatus of FIG. 1.

The exposed face of coin 40 serves as a reflective or mirror surface for the laser beam and reflects the beam as directed through each hole 45 to a photographic film in a cassette 41, FIG. 5. The cassette 41 is inserted into the housing 11 through the cassette door 15.

The photographic film cassette is of known configuration, and may, for example, be of the type commonly used in so-called instant cameras.

The collimated laser beam refects to the film, to cause an image thereon, corresponding to the surface configuration and peripheral edge configuration of the coin. It has been found that all portions of the beam will reflect from the coin surface, with the regularly coin surface acting as a mirror, surface to generate such reflection. Irregularities are enhanced on the photographic film as the beam is diffused. Similarly, if the coin surface contains a flaw, the collimated beam, tends to diffuse and enlarge the flaw to be more clearly shown on the film.

The collimating screen 32 comprises a dish-shaped body 44 having a radius of curvature equal to the distance from the laser beam generator to the collimating screen. The pattern of small circular holes 46 is provided through the body at the center thereof, with each hole extending normal to the tangent of the exiting side of the dish. The laser beam, directed at the body 44, is then formed into a discrete light beam passing through a hole 45 that is directed against the surface of a coin. The discrete beam sequentially formed from the light passing through the holes 45 in the screen 32 are all directed to the coin, and, upon reflection from the coin are directed back, to form the photographic image.

Figure 3:
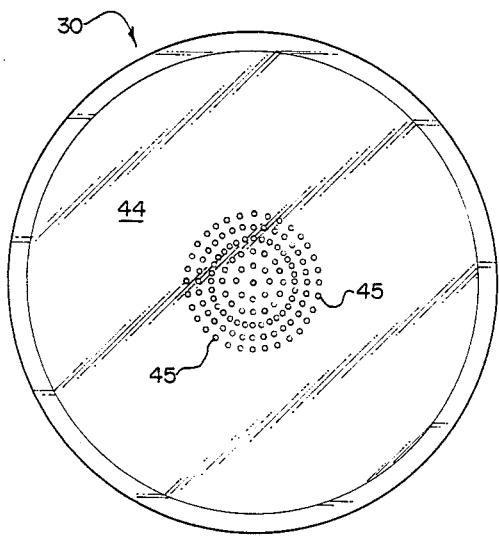
FIG. 3 is a sectional view, taken on the line 3—3 of FIG. 2.
Figure 4:
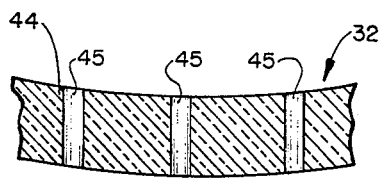
FIG. 4 is a greatly enlarged fragmentary section, taken on the line 4—4 of FIG. 3.
Figure 6:
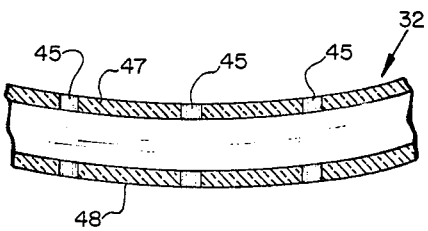
FIG. 6 is a view like that of FIG. 3, but showing another embodiment of collimating screen.

If, as shown in FIGS. 2-4, the dish body has a single thickness, a single opening 45 may be used for each hole. If, however, the dish is provided with spaced apart inner and outer surface layers, a pair of aligned openings must be provided through the layers to permit light transmission and formation of discrete beams. As shown in FIG. 6, a body 44 having such inner and outer spaced layers 47 and 48, may have layers spaced apart by intermediate rib structures or by any conventional honey-comb type material that will not block light transmissions through the aligned holes.

A microscope 50 is mounted through the top of housing 11 and is adjusted to focus at a point "x" on a coin 40. The point "x" is pre-assigned for each type of coin and is precisely located with respect to the center of the coin when the coin is held in position by the wheels 22.

One wheel 22 has a shaft 51 extending from the center thereof through a slot 52 in the table 19. The slot allows the wheel attached to the shaft 51 to move in and out under the influence of its spring 25, as previously described. A knob 53 is provided on the shaft 51 and turning of knob 53 will turn the associated wheel 22, and by frictional engagement the coin engaged by the wheels. Thus the coin can be readily, but gently rotated until the assigned point "x" is beneath the cross hairs of the microscope 50.

Although preferred forms of my invention have been herein disclosed, it is to be understood that the present disclosure is by way of example and that variations are possible without departing from the subject matter coming within the scope of the following claims, which subject matter I regard as my invention.

I claim:

1. A numismatic detector comprising
   a laser beam generator within a closed box;
   a table within the closed box adapted to receive a coin thereon;
   means precisely positioning said coin on said table; and
   means positioning photographic film to receive the reflection of the laser beam directed towards the coin table.

2. A numismatic detector as in claim 1, further including
   access door means through the box to permit access to the laser generator means and to the coin table, and to the means for holding photographic film.

3. A numismatic detector as in claim 2, further including
   means to collimate the laser beam from the laser generator before the beam hits the coin table.

4. A numismatic detector as in claim 3, wherein the means for collimating comprises a
   collimating dish spaced between the laser generator and the coin table and having a partition of holes through the center thereof through which the laser light is directed to the coin table; and
   means to direct the laser beam sequentially through the pattern of holes through the collimating dish.

5. A numismatic detector as in claim 4, wherein
   the collimating screen is of dish-like configuration having a radius of curvature equal to the distance from the laser beam generator to the collimating screen.

6. A numismatic detector as in claim 5, wherein
   the holes through the dish extend normal to tangents of the dish at the side opposite the laser beam generator.

7. A numismatic detector as in claim 6, wherein
   a laser compartment and a film compartment are formed in the box and the compartments are divided by a partition, such partition having light absorbing surfaces thereon.

8. A numismatic detector as in claim 7, wherein the means for positioning a coin on the table comprises
   three wheels, equi-angularly spaced around the center of location of a coin on the table; and
   means biasing the wheels toward a coin placed on said table, whereby said wheels hold said coin in a precise location.

9. A numismatic detector as in claim 8, wherein
   the surface of the coin table is covered with light absorbing material, and the wheels are of soft, non-abrading material.

10. A numismatic detector as in claim 8 further including
    means to drive one of said wheels to thereby rotate a coin engaged by the wheels.

11. A numismatic detector as in claim 10 further including
    means to physically observe movement of an assigned spot on the coin to a precise location as the coin is rotated.

* * * * *